H. C. GIBSON.
WHEEL.
APPLICATION FILED OCT. 17, 1916. RENEWED SEPT. 16, 1921.
1,413,981.
Patented Apr. 25, 1922.
2 SHEETS—SHEET 1.
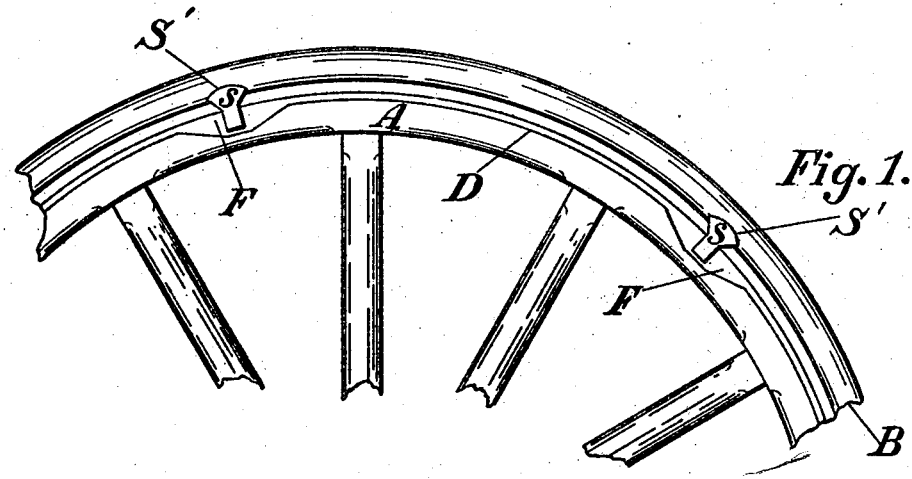
Fig. 1.
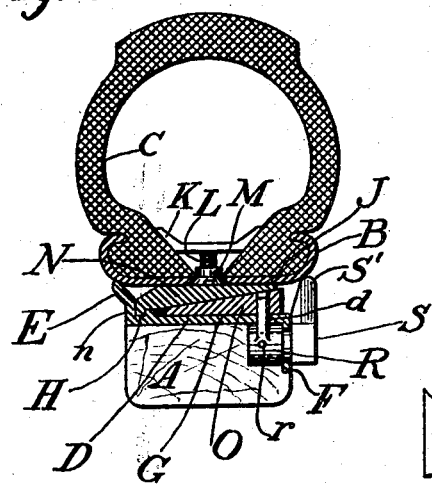
Fig. II.
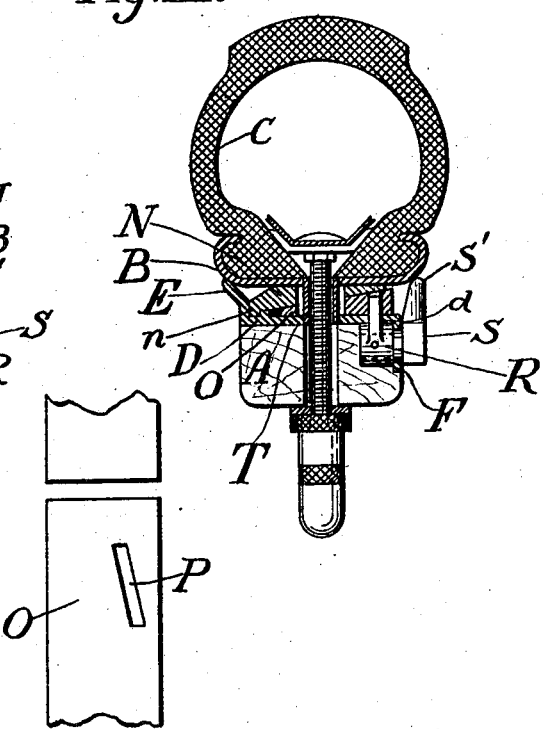
Fig. III.
Fig. IV.
WITNESSES:
N. Muchmore
John Darby
Inventor
Hugo C. Gibson.
By his Attorney
Hermann Hunt

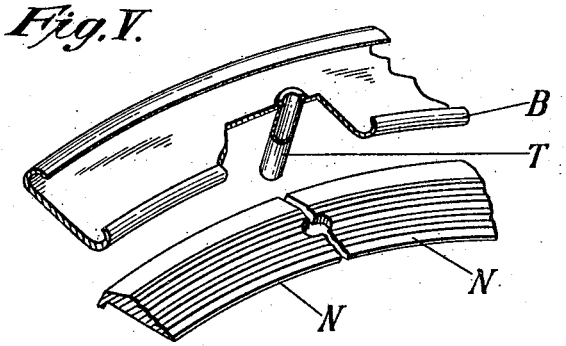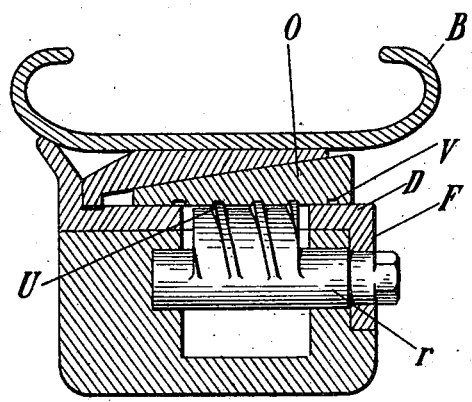

UNITED STATES PATENT OFFICE.

HUGO C. GIBSON, OF NEW YORK, N. Y.

WHEEL.

1,413,981.  Specification of Letters Patent.  Patented Apr. 25, 1922.

Original application filed March 16, 1907, Serial No. 362,727. Renewed March 17, 1916, Serial No. 84,954. Patent No. 1,204,658, dated November 15, 1916. Divided and this application filed October 17, 1916, Serial No. 126,094. Renewed September 16, 1921, Serial No. 501,183.

*To all whom it may concern:*

Be it known that I, HUGO C. GIBSON, a British subject, residing in the borough of Manhattan, city and State of New York, have invented certain new and useful Improvements in Wheels, of which the following is a full and clear description, reference being had to the accompanying drawings.

This invention relates to wheels, and more particularly to means for removably attaching the rim portion to the wheel proper, as has been shown and described in original application for Letters Patent filed March 16, 1907, Serial No. 362,727, renewed March 17, 1916, Serial No. 84,954, now Patent 1,204,658, Nov. 15, 1916, and of which original application this case is a division and relates to inventions originally shown, or which in said original case were described and not shown, such features as are claimed herewith have as their particular objects means for attaching an inflated tire to a felly in ways to secure ready demounting, simplicity of construction, resistance to circumferential drive and in general strength and economy and other features as will appear from the following description.

My invention is more particularly set forth by reference to a specific embodiment, which I now fully describe with reference to the drawings hereto appended and forming a part hereof, changes or modifications from this specific form may be made without departure from my invention as hereinafter claimed.

In the drawings, Fig. I is a side view of part of a wheel, without tire, and with spokes part broken away; Fig. II is a section of felly and adjacent parts, with tire of what is known as the "clincher" type, showing means of attachment of tire shoe or cover to its rim; Fig. III is a section of felly with completely detachable rim and the attaching means, showing the valve stem of the tire passing through the felly and other parts; Fig. IV is a view from the under side of the adjacent ends of the split ring locking or attaching band; Fig. V is a fragmentary exploded perspective view of rim and locking band showing ferrule to pass between band ends; Fig. VI is a section of form showing the helical cam for tightening locking wedge.

The form of my invention thus illustrated consists essentially of the felly A, the rim B with its tire C. On the felly is secured a band D, along one edge of which is a ridge E, while on the opposite side is a flange F, extending inwardly beside the felly. This flange F may be interrupted, that is in sections, at a number of places, or continuous. The seat G of the felly band I prefer to make cylindrical and may have a groove H close to the felly in any desired manner.

The seat J, of the rim B is cylindrical. The tire C is attached to the rim by means of lugs K, the stems L of which are engaged by lug nuts M, the heads of which are countersunk, leaving the seat J flush. Between the rim seat J and felly band seat G, are two bands which I will call the clamping band N and the locking band O, each having one face cylindrical and the other tapered, whereby both bands co-operate as wedges. Band N may have a lip $n$ registering with the groove H. Band O has a plurality of slots P obliquely disposed. Engaging with each slot is a stud or like part $d$, projecting through band D, forming part of or operated by a locking block R. The latter consists of a shank projecting laterally under the band D, and the head S with an enlargement S' on one side.

It will thus be seen that my completely removable rim with tire on and inflated can be attached to the wheel proper by moving it laterally over the felly band when the locking band O is withdrawn, that is, moved to the right as shown in the figures of section. After rim and tire have been moved into place, that is, moved to the left so that the rim engages the ridge E, stopping the rim in the desired position they are secured. The securing is effected by turning the heads S of the locking blocks by any convenient means preferably a special tool or ordinary wrench, and the action of turning revolves the stud $d$ in the oblique groove P in the locking band O, whereby the band O is forced laterally, and by the wedging action, owing to its engagement with the clamping band N, it expands this band, thereby securely clamping or mechanically locking the tire with its rim B, to the felly band D. The feature in my preferred form of a band N which is expanded has the added advantage of contracting when band O is withdrawn, thereby freeing from and completely loosening the completely detachable rim immediately. The positioning ridge E may be interrupted or supplanted by suitable stops of other forms, but my preferred form as shown more securely locates the rim, and has the added advantage of protecting the clamping parts on that side from mud, dust or water. This feature is of importance when considered with the arrangement of locking bands and concealed locking means, the location of which latter is away from dirt and water, and therefore free from the objections to various other forms of tire rim attaching construction.

The enlargement S' on the head of the locking block engages one edge of the rim B on the opposite side from the rim positioning ridge E, and this engagement including in my preferred form a slight roughness on the inner face of S', results in engagement preventing the rotation of the locking block, unless the same is forcibly rotated by the means used for setting it up. This attachment or clamping I term "setting-up." The locking band and consequently its slots are positioned by registering of valve tube T, hereinafter described or by other suitable means. It will be seen that in the act of setting-up, the clamping band O will tightly contract on the seat G of the felly band D, while the setting-up will expand the clamping band N, and cause it to securely bind on the seat J, being the inner surface of the completely detachable rim. In order to remove the rim and tire, the locking blocks, of which there are a plurality at intervals around the felly, are turned half around so that the enlargement S' is out of the way, and no portion of the head S projects to a sufficient extent to interfere with the lateral removal of the completely detachable rim and tire. This rotation of the locking blocks effects by means of the stud or cam member $d$, a withdrawal of the locking band O, and the band N being held through the lip $n$, engaging with the groove H, the disengaging of the conical band surfaces permits the contraction of the band N, whereupon the rim with its tire is free and may be laterally removed.

While many details of construction or variations are possible, in my preferred form I use clamping and locking bands of rolled steel, while the conical surfaces or faces may be finished in order to permit of more free movement in setting-up, and in my preferred form I likewise may not machine the cylindrical face of each of the bands as unmachined they more securely bind with the seat of the rim and the seat of the felly band respectively.

It will be seen that I can employ any form of rim with its pneumatic tire inflated before hand and comprising a unit ready for use. Forms of flush valve for inflating the tire may be used, or side valves, but if desired a long stem valve may be used, as more particularly shown in Fig. III. In the latter case the attachment of the rim is effected by first passing the long stem valve through the hole in the securing bands and the hole in the felly, after which insertion the rim then seated at one side is laterally pushed onto the rim at the opposite side of the wheel. In my preferred form I employ a tube T around the valve stem hole, secured to the wheel rim B, which upon insertion passes through holes or transverse slots in the securing bands or between their ends and into a hole in the felly band as illustrated in Fig. V in which band N split has its adjacent ends fashioned to accommodate the tube B. In the figure this is illustrated with the rim slightly removed as in the act of insertion. This secures registering of these parts at the valve hole and relieves strain or abrasion from the valve stem itself. The hole through the felly proper is made sufficiently larger than the valve stem so that the slight tilting necessary when mounting this form of construction, can be readily effected.

While certain parts of my invention may be embodied without respect to the flush tire attaching lug nut M, when the latter is used the nut protrudes on the upper side of the rim and the threaded shank or lug stem passes into it in a manner as will be seen by reference to Fig. II, affording a sufficient number of threads to securely hold the lug, whereas the protruding nut affords a ready means of finding its location when inserting and clamping the tire C to the rim B.

While the locking block, as shown in my preferred construction, has the stud $d$ passing through a straight slot in the felly band D, and engaging with the edge of the slot in the felly band, thereby bringing the shearing strain of the locking stud directly between the locking band O and the felly band D, this construction may be modified so that the slot in the felly band D is wide enough to permit free movement of a helical cam or prolonged locking stud on the shank $r$ of the locking block R, as shown in Fig. VI in which the helical members U engage circumferential grooves V on the underside of the band O and under these circumstances the bearing or resistance against lateral movement of R may be afforded by engagement of the shank of R in a manner as shown in one form against the flange F, of the felly band D. In this latter construction the prolonged stud or cam affords a greater shearing strength, and being less than 180 degrees permits entire disengagement from the band O of the locking stud. It also effects more securely, readily and effectively the releasing or setting-up of the locking band.

In the embodiment of my invention in some forms I may secure the band N more or less permanently to the seat of the rim. This is not, however, my preferred form, and may necessitate the complete removal of the clamping or locking band preliminary to the removal of the rim.

It will be seen that in my preferred form it is possible, owing to the cylindrical seat on the completely detachable rim, to mount the rim and tire either side first, which means that the seat of the rim must be symmetrical about the medial plane of the rim as a whole, which has its marked advantages. The ridge E being permanent and being on the felly band conforms to practical requirements, because in view of the difference in the two ends of the hub in a wheel, wheels are invariably one-sided, and even one-sidedness of the felly band by way of an inclined seat is therefore not objectionable.

It will thus be seen that my invention affords the greatest facility in the ready and quick removal or attachment of a previously inflated tire to a wheel, and at the same time is a simple and inexpensive construction, and when attachment is effected has the result of most positively locking the completely detachable rim and tire to the wheel, in a manner most effective to resist the great strain to which such tire shod wheels are subjected, as in the use of high-speed and high-powered automobiles.

While various modifications in detail or arrangement of my invention are possible, including under certain conditions omission of some of the elements shown and described in the specific form herewith illustrated, I do not therefore wish to limit myself to what is specifically shown and described, but what I claim and desire to secure by Letters Patent, is:

1. The combination in a wheel, of a removable rim, a felly, a securing band between the rim and felly having a transverse split, a tire valve, a radial shank surrounding said valve and arranged to engage the abutting ends of said split band and a hole in the felly, a hole in said felly, whereby the engagement of the radial shank with the felly prevents circumferential movement of the tire and abrasion of the split band against the valve.

2. The combination in a wheel of a tire and its completely removable rim, a felly, a slot in said felly, a locking member between said felly and said rim adjacent to said slot, a helical cam supported in said slot and engaging said locking member and means for operating said helical cam to effect locking of said rim to said felly.

3. The combination in a wheel of a removable tire rim, a felly, a wedge between the rim and the felly to lock them together, means for forcing the wedge in position comprising a rotatable stud and a helical surface moved thereby in engagement with cooperating recesses on the locking ring.

Signed this 16th day of October, 1916.

HUGO C. GIBSON.

Witnesses:
HERMANN F. CUNTZ,
H. MUCHMORE.